US007665579B2

(12) United States Patent
Itose

(10) Patent No.: US 7,665,579 B2
(45) Date of Patent: Feb. 23, 2010

(54) FLOW CONTROL VALVE HAVING PRESSURE COMPENSATING VALVE

(75) Inventor: Masakazu Itose, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 520 days.

(21) Appl. No.: 11/342,593

(22) Filed: Jan. 31, 2006

(65) Prior Publication Data

US 2006/0191405 A1 Aug. 31, 2006

(30) Foreign Application Priority Data

Feb. 28, 2005 (JP) ............................. 2005-053733

(51) Int. Cl.

| | |
|---|---|
| ***B66F 9/22*** | (2006.01) |
| ***F15B 11/04*** | (2006.01) |
| ***F01B 1/06*** | (2006.01) |
| ***B66B 9/04*** | (2006.01) |
| ***F16K 17/26*** | (2006.01) |

(52) U.S. Cl. ........................... 187/234; 91/444; 91/446; 91/448; 187/275; 137/490; 137/491; 137/493.5; 137/493.6

(58) Field of Classification Search ................. 187/234, 187/275, 240, 244; 91/444, 448, 406, 454, 91/455, 447; 137/493.6, 493.5, 490, 491; *B66B 1/24; B66F 9/22*

See application file for complete search history.

(56) References Cited

U.S. PATENT DOCUMENTS 4,364,304 A * 12/1982 Andersen et al. .............. 91/420
5,131,514 A * 7/1992 Machida .................... 192/85 R
6,065,386 A * 5/2000 Rub et al. ....................... 91/31

FOREIGN PATENT DOCUMENTS

| | | | | |
|---|---|---|---|---|
| JP | 50-124079 | | | 10/1975 |
| JP | 58-216899 | | | 12/1983 |
| JP | 06191800 | A | * | 7/1994 |
| JP | 8-100804 | A | | 4/1996 |
| JP | 8-143294 | A | | 6/1996 |
| JP | 2007162848 | A | * | 6/2007 |
| JP | 2008030896 | A | * | 2/2008 |

* cited by examiner

*Primary Examiner*—John Q Nguyen
*Assistant Examiner*—Stefan Kruer
(74) *Attorney, Agent, or Firm*—Birch, Stewart, Kolasch & Birch, LLP

(57) ABSTRACT

A flow control valve includes a pressure compensating valve and a first switching valve. The pressure compensating valve is configured to enlarge an opening area of a variable orifice between a load pressure line and a compensating pressure line when a pressure of working fluid of the compensating pressure line is smaller than a first set pressure, and narrow the opening area of the variable orifice when the pressure of the working fluid of the compensating pressure line is larger than the first set pressure. The first switching valve is configured to switch between a meter-out operation and a neutral operation by an external operation, wherein the working fluid of the compensating pressure line is drained in the meter-out operation, the working fluid of the compensating pressure line is not drained in the neutral operation. The load pressure line guides the working fluid to be supplied to an actuator.

4 Claims, 6 Drawing Sheets

FLOW CONTROL VALVE HAVING PRESSURE COMPENSATING VALVE

BACKGROUND OF THE INVENTION

1. Field of the Invention

The present invention relates to a flow control valve. More particularly, the present invention relates to a flow control valve for controlling the oil pressure applied to a hydraulic actuator.

2. Description of the Related Art

A forklift for driving a fork that holds a load by using oil pressure has been well known. The forklift includes a lift cylinder for driving the fork that holds a load along with a flow control valve. FIG. 1 is a schematic view showing the conventional flow control valve. The flow control valve 101 includes a direction switching valve 102 and a check valve 103. The flow control valve 101 further includes a plurality of lines for guiding hydraulic oil to transmit oil pressure. The plurality of lines is composed of a pump pressure line 111, a pump pressure line 112, a load pressure line 113 and a drain line 115.

The pump pressure line 111 connects the direction switching valve 102 to a pump not shown and leads hydraulic oil supplied by the pump. The pump pressure line 112 connects a check valve 103 to the direction switching valve 102. The load pressure line 113 connects the check valve 103, the lift cylinder 104 and the direction switching valve 102. The drain line 115 connects the direction switching valve 102 to a tank 106 and the oil pressure of the drain line 115 is substantially zero (0).

The check valve 103 prevents hydraulic oil from flowing from the load pressure line 113 to the pump pressure line 112. That is, the check valve 103 connects the pump pressure line 112 to the load pressure line 113 when the oil pressure of the pump pressure line 112 is larger than that of the load pressure line 113, and does not connect the pump pressure line 112 to the load pressure line 113 when the oil pressure of the load pressure line 113 is larger than that of the pump pressure line 112.

The lift cylinder 104 is an actuator for lifting and lowering the fork of the forklift. That is, the lift cylinder 104 lifts the fork of the forklift when hydraulic oil is supplied from the load pressure line 113 and lowers the fork of the forklift when hydraulic oil is discharged into the load pressure line 113. At this time, the oil pressure of the load pressure line 113 varies depending on the weight of a load held by the fork of the forklift and becomes larger as the load is heavier.

The direction switching valve 102 can occupy one of a neutral position, a meter-in position and a meter-out position. That is, operated by the user, the direction switching valve 102 is switched from the neutral position to the meter-in position, from the neutral position to the meter-out position, from the meter-in position to the neutral position and from the meter-out position to the neutral position.

At the meter-in position, the direction switching valve 102 connects the pump pressure line 111 to the pump pressure line 112, closes the load pressure line 113 and closes the drain line 115. At the meter-out position, the direction switching valve 102 closes the pump pressure line 111, closes the pump pressure line 112 and connects the load pressure line 113 to the drain line 115. At the neutral position, the direction switching valve 102 closes the pump pressure line 111, closes the pump pressure line 112, closes the load pressure line 113 and closes the drain line 115.

The tank 106 stores hydraulic oil flowing through the drain line 115 therein. The hydraulic oil stored in the tank 106 is supplied to the pump pressure line 111 by a pump not shown.

Operations of the flow control valve 101 include a meter-in operation, a neutral operation and a meter-out operation. The meter-in operation is an operation performed when the direction switching valve 102 is switched from the neutral position to the meter-in position by means of the user's operation. The neutral operation is an operation performed when the direction switching valve 102 is switched from the meter-in position or the meter-out position to the neutral position by means of the user's operation. The meter-out operation is an operation performed when the direction switching valve 102 is switched from the neutral position to the meter-out position by means of the user's operation.

In the meter-in operation, hydraulic oil is supplied from the pump pressure line 111 to the lift cylinder 104 through the direction switching valve 102, the pump pressure line 112, the check valve 103 and the load pressure line 113. When the hydraulic oil is supplied, the lift cylinder 104 lifts the fork.

In the neutral operation, since the switching valve 102 closes connection between the pump pressure line 111 and the pump pressure line 112 and between the load pressure line 113 and the drain line 115, no hydraulic oil of the lift cylinder 104 is supplied or discharged and thus lifting or lowering of the fork is stopped. At this time, the load pressure varies depending on a load held by the fork of the forklift and becomes larger as the load is heavier.

In the meter-out operation, hydraulic oil is discharged from the lift cylinder 104 to the drain line 115 through the load pressure line 113 and the direction switching line 102. When the hydraulic oil is discharged, the lift cylinder 104 lowers the fork.

Even when the operation quantity of the direction switching valve 102 is identical, the higher the oil pressure of the load pressure line 113 is, the higher the hydraulic oil flows from the load pressure line 113 to the drain line 115. That is, in the forklift to which the flow control valve 101 is applied, even with the same operation quantity, the heavier the held load is, the faster the folk is lowered. A forklift with a fork having high operability has been desired.

In conjunction with the above description, Japanese Laid-Open Patent Application JP-A-Heisei, 08-100804 discloses a pressure compensating valve which only varies a set pressure of a relief valve without exchanging a piston, etc. The pressure compensating valve includes: a valve for opening and closing an inlet port and an outlet port; a piston for pressing the valve in the closing direction with a load pressure within a pressure chamber; an intermediate pressure chamber connected to the inlet port through a small cavity for pressing the valve in the closing direction; and a variable set pressure relief valve for relieving pressure oil in the intermediate pressure chamber to the outlet port through the small cavity.

SUMMARY OF THE INVENTION

An object of the present invention is to provide a flow control valve which improves operability of a hydraulic actuator.

Another object of the present invention is to provide a flow control valve which reduces the influence of a load of a hydraulic actuator.

Still another object of the present invention is to provide a flow control valve which reduces hunting of the operation of a hydraulic actuator.

Yet still another object of the present invention is to provide a flow control valve which reduces shock of the operation of a hydraulic actuator.

It is also an object of the present invention to provide a forklift which improves operability of a fork.

This and other objects, features and advantages of the present invention will be readily ascertained by referring to the following description and drawings.

In order to achieve an aspect of the present invention, the present invention provides a flow control valve comprising a pressure compensating valve and a first switching valve. The pressure compensating valve is configured to enlarge an opening area of a variable orifice between a load pressure line and a compensating pressure line when a pressure of working fluid of said compensating pressure line is smaller than a first set pressure, and narrow said opening area of said variable orifice when said pressure of said working fluid of said compensating pressure line is larger than said first set pressure. The first switching valve is configured to switch between a meter-out operation and a neutral operation by an external operation, wherein said working fluid of said compensating pressure line is drained in said meter-out operation, said working fluid of said compensating pressure line is not drained in said neutral operation. Said load pressure line guides said working fluid to be supplied to an actuator.

The flow control valve may further comprise a relief valve configured to drain said working fluid of said compensating pressure line when said pressure of said working fluid of said compensating pressure line is larger than a second set pressure, and configured not to drain said working fluid of said compensating pressure line when said pressure of said working fluid of said compensating pressure line is smaller than said second set pressure.

In the flow control valve, said first switching valve may switch among a meter-in operation, a meter-out operation and a neutral operation by an external operation. Working fluid may be supplied to said load pressure line in said meter-in operation for operating said actuator.

In the flow control valve, said relief valve may not be connected to said compensating pressure line when said first switching valve is in said meter-in operation.

In the flow control valve, said first switching valve may include a first spool chamber and a first spool configured to be slidably inserted into said first spool chamber. Said relief valve may include a second spool chamber configured to be formed in said first spool and a second spool configured to be slidably inserted into said second spool chamber.

The flow control valve may further comprise a second switching valve configured to connect said compensating pressure line to said relief valve when said first switching valve is in said neutral operation and said meter-out operation, and configured not to connect said compensating pressure line to said relief valve when said first switching valve is in said meter-in operation.

In the flow control valve, said first switching valve may switch among a meter-in operation, a meter-out operation and a neutral operation by an external operation. Working fluid may be supplied to said load pressure line in said meter-in operation for operating said actuator.

In order to achieve another aspect of the present invention, the present invention provides a forklift comprising a flow control valve, a fork configured to lift a load and an actuator configured to be connected between said flow control valve and said fork. Said flow control valve includes a pressure compensating valve and a first switching valve. The pressure compensating valve is configured to enlarge an opening area of a variable orifice between a load pressure line and a compensating pressure line when a pressure of working fluid of said compensating pressure line is smaller than a first set pressure, and narrow said opening area of said variable orifice when said pressure of said working fluid of said compensating pressure line is larger than said first set pressure. The first switching valve is configured to switch between a meter-out operation and a neutral operation by an external operation, wherein said working fluid of said compensating pressure line is drained in said meter-out operation, said working fluid of said compensating pressure line is not drained in said neutral operation. The load pressure line guides said working fluid to be supplied to said actuator.

In the forklift, said flow control valve may further include a relief valve configured to drain said working fluid of said compensating pressure line when said pressure of said working fluid of said compensating pressure line is larger than a second set pressure, and configured not to drain said working fluid of said compensating pressure line when said pressure of said working fluid of said compensating pressure line is smaller than said second set pressure.

In the forklift, said first switching valve may switch among a meter-in operation, a meter-out operation and a neutral operation by an external operation. Working fluid is supplied to said load pressure line in said meter-in operation for operating said actuator.

In the forklift, said relief valve may not be connected to said compensating pressure line when said first switching valve is in said meter-in operation.

In the forklift, said first switching valve includes a first spool chamber and a first spool configured to be slidably inserted into said first spool chamber. Said relief valve includes a second spool chamber configured to be formed in said first spool and a second spool configured to be slidably inserted into said second spool chamber.

In the forklift, said flow control valve further includes a second switching valve configured to connect said compensating pressure line to said relief valve when said first switching valve is in said neutral operation and said meter-out operation, and configured not to connect said compensating pressure line to said relief valve when said first switching valve is in said meter-in operation.

In the forklift, said first switching valve switches among a meter-in operation, a meter-out operation and a neutral operation by an external operation, wherein working fluid is supplied to said load pressure line in said meter-in operation for operating said actuator.

DETAILED DESCRIPTION OF THE INVENTION

Figure 1:
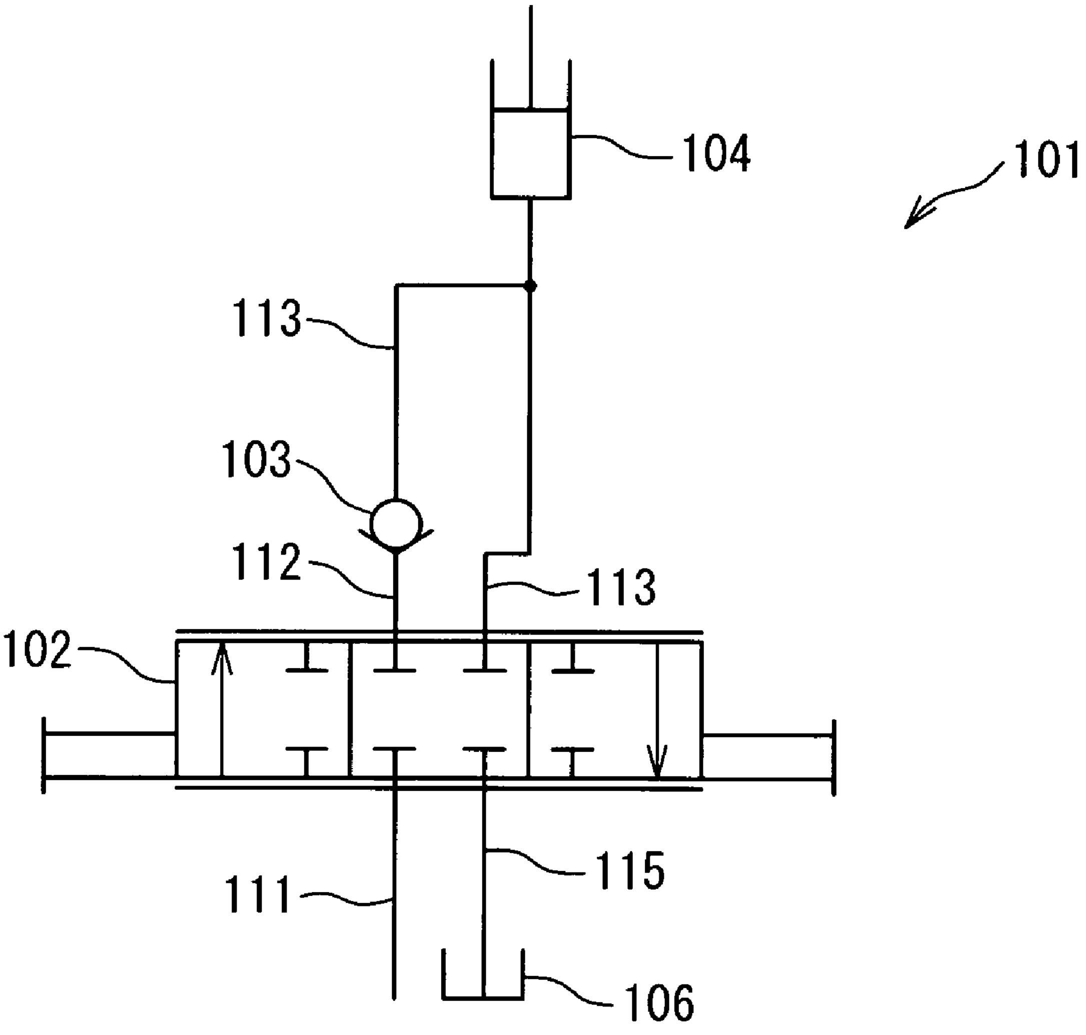
Fig. 1 PRIOR ART
FIG. 1 is a schematic view showing the conventional flow control valve.
Figure 2:
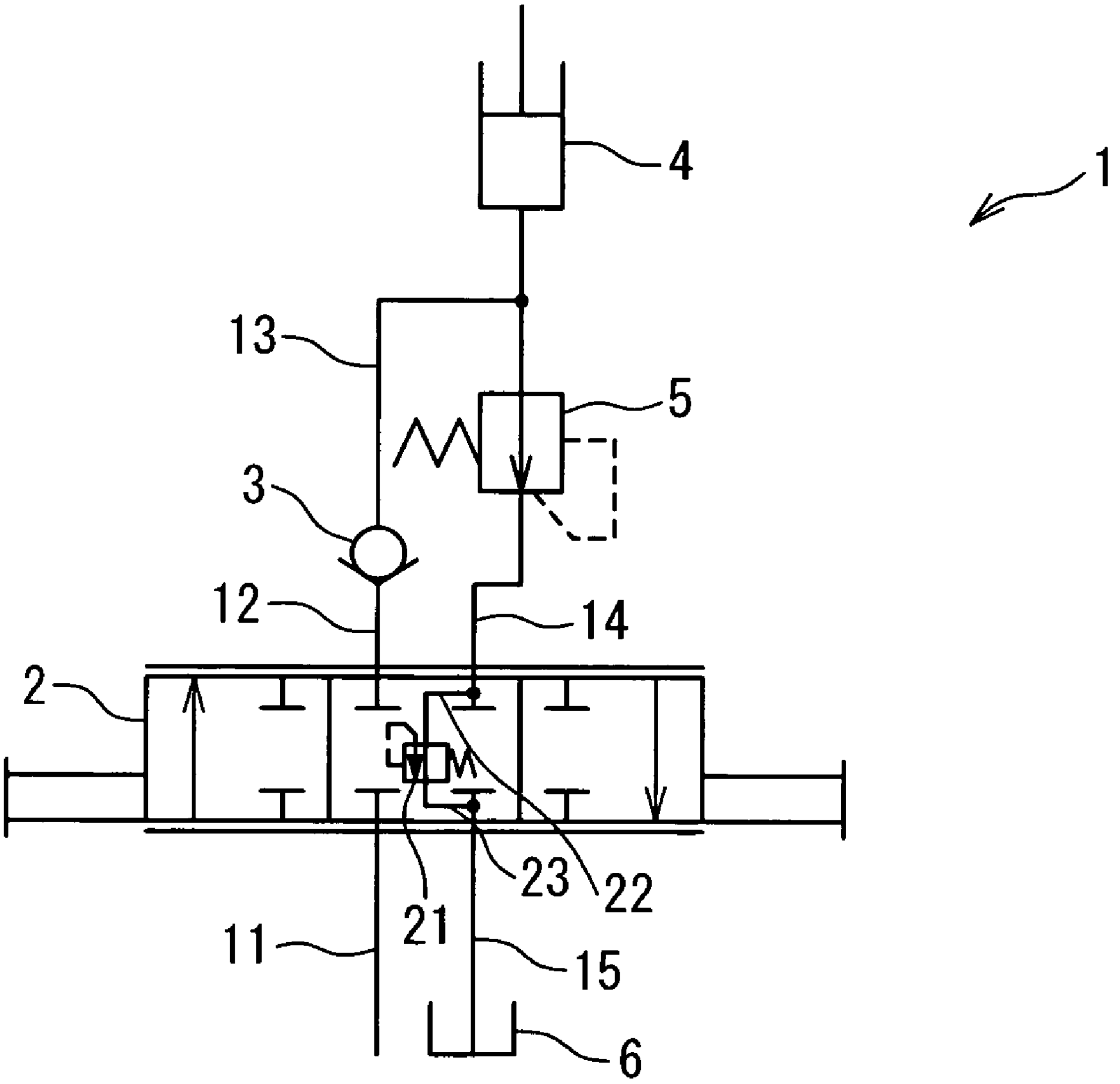
FIG. 2 is a schematic view showing the flow control valve of the present invention.

An embodiment of a forklift according to the present invention will be described below with reference to attached drawings. The forklift includes a lift cylinder for driving a folk that holds a load along with a flow control valve. FIG. 2 is a schematic view showing the flow control valve of the present invention. As shown in FIG. 2, the flow control valve 1 includes a direction switching valve 2, a check valve 3 and a pressure compensating valve 5. The flow control valve 1 further includes a plurality of lines for guiding hydraulic oil to transmit oil pressure. The plurality of lines is composed of a pump pressure line 11, a pump pressure line 12, a load pressure line 13, a compensating pressure line 14 and a drain line 15.

The pump pressure line 11 connects the direction switching line 2 to a pump not shown and guides hydraulic oil supplied by the pump. The pump pressure line 12 connects the direction switching valve 2 to the check valve 3. The load pressure line 13 connects between the check valve 3, the lift cylinder 4 and the pressure compensating valve 5. The compensating pressure line 14 connects the pressure compensating valve 5 to the direction switching valve 2. The drain line 15 connects the direction switching valve 2 to a tank 6 and the oil pressure of the drain line 15 is substantially zero (0). The check valve 3 prevents hydraulic oil from flowing from the load pressure line 13 to the pump pressure line 12. That is, the check valve 3 connects the pump pressure line 12 to the load pressure line 13 when the oil pressure of the pump pressure line 12 is larger than that of the load pressure line 13, and the check valve 3 does not connect the pump pressure line 12 to the load pressure line 13 when the oil pressure of the load pressure line 13 is larger than that of the pump pressure line 12. The check valve 3 may be omitted from the flow control valve 1.

The lift cylinder 4 is an actuator for lifting and lowering the fork of the forklift according to the present invention. That is, the lift cylinder 4 lifts the fork of the forklift when hydraulic oil is supplied from the load pressure line 13 and lowers the fork of the forklift when hydraulic oil is discharged into the load pressure line 13. At this time, the oil pressure of the load pressure line 13 varies depending on the weight of a load held by the fork of the forklift and becomes larger as the load is heavier.

The pressure compensating valve 5 controls the oil pressure of the compensating pressure line 14 so as to become a set pressure. That is, the pressure compensating valve 5 enlarges the opening area of a variable orifice between the load pressure line 13 and the compensating pressure line 14 when the oil pressure of the compensating pressure line 14 is smaller than the set pressure, and narrows the opening area of the variable orifice when the oil pressure of the compensating pressure line 14 is larger than the set pressure.

The direction switching valve 2 includes a relief valve 21, an inlet side line 22 and an outlet side line 23. The relief valve 21 prevents the oil pressure of the inlet side line 22 from exceeding a set pressure by providing the set pressure. The set pressure of the relief valve 21 is larger than that of the pressure compensating valve 5. That is, the relief valve 21 connects the line 22 to the outlet side line 23 when the oil pressure of the inlet side line 22 is larger than that of the set pressure, and does not connect the line 22 to the outlet side line 23 when the oil pressure of the inlet side line 22 is smaller than that of the set pressure.

The direction switching valve 2 can occupy one of a neutral position, a meter-in position and a meter-out position. That is, operated by the user, the direction switching valve 2 is switched from the neutral position to the meter-in position, from the neutral position to the meter-out position, from the meter-in position to the neutral position and from the meter-out position to the neutral position.

At the meter-in position, the direction switching valve 2 connects the pump pressure line 11 to the pump pressure line 12, closes the compensating pressure line 14 and closes the drain line 15. At the meter-out position, the direction switching valve 2 closes the pump pressure line 11, closes the pump pressure line 12 and connects the compensating pressure line 14 to the drain line 15.

At the neutral position, the direction switching valve 2 closes the pump pressure line 11, closes the pump pressure line 12, connects the compensating pressure line 14 to the inlet side line 22 and connects the line 23 to the drain line 15. That is, at the neutral position, the direction switching valve 2 performs control such that the oil pressure of the compensating pressure line 14 does not exceed the set pressure set for the relief valve 21.

At the meter-out position, the direction switching valve 2 may connect the compensating pressure line 14 to the inlet line 22 and the line 23 to the drain line 15. That is, at the meter-out position, the direction switching valve 2 may perform control such that the oil pressure of the compensating pressure line 14 does not exceed the set pressure set for the relief valve 21.

The tank 6 stores hydraulic oil flowing through the drain line 15 therein. The hydraulic oil stored in the tank 6 is supplied to the pump pressure line 11 by a pump not shown.

Figure 6:
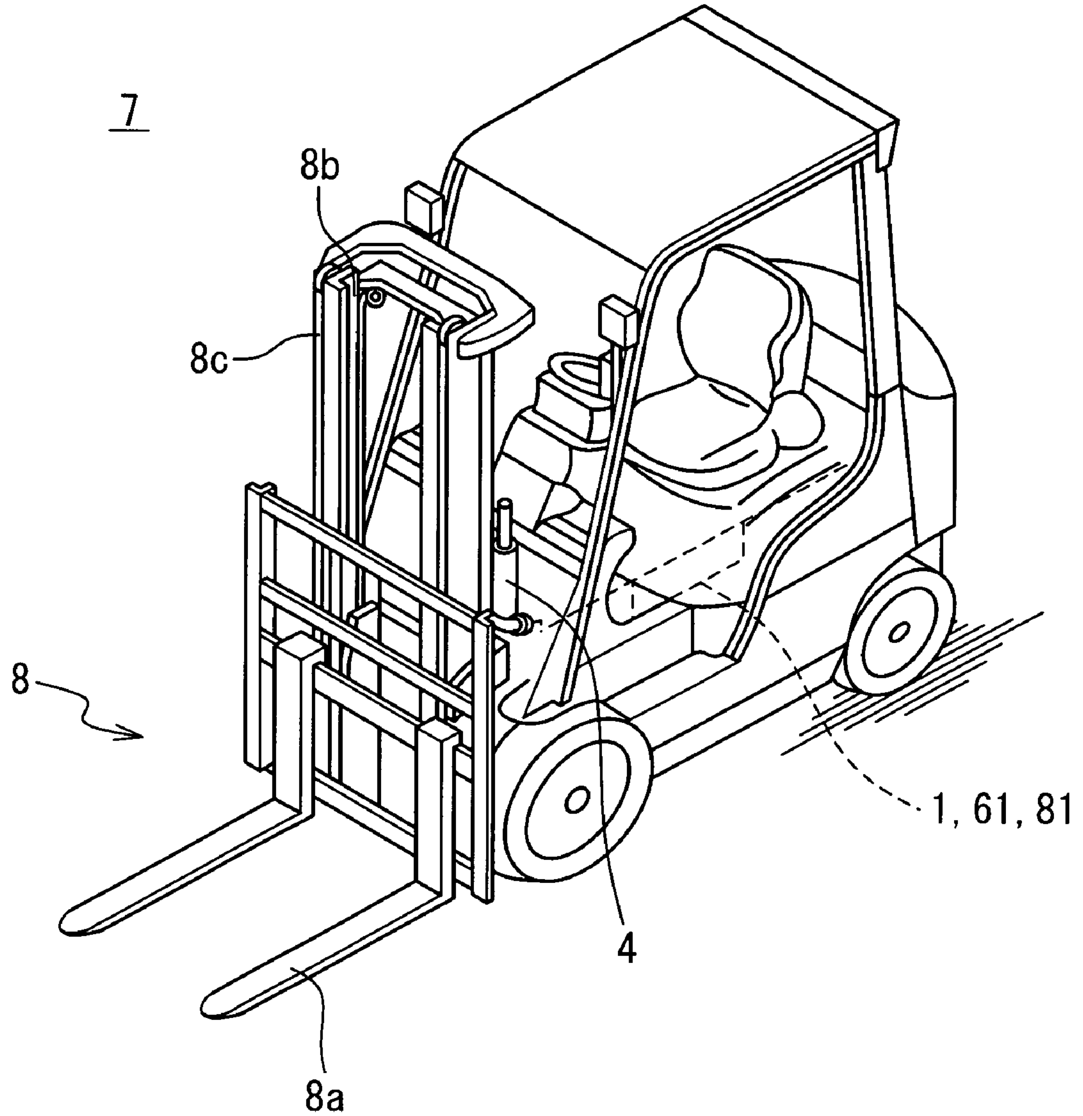
FIG. 6 is a schematic perspective view showing the forklift with the flow control valve of the present invention.

FIG. 6 is a schematic perspective view showing the forklift with the flow control valve of the present invention. The forklift 7 includes the flow control valve 1, the fork 8 and the lift cylinder 4. The flow control valve 1 is included in a hydraulic circuit (not shown) mounted on the forklift 7. The lift cylinder 4 is connected between the flow control valve 1 and the fork 8. The fork 8 lifts and lowers a load. The lift cylinder 4 drives the folk 8 along with the flow control valve 1. The fork 8, for example, is composed of an outer mast **8*c*, an inner mast 8*b* and a fork body 8. The inner mast 8*b* is lifted up and down to the vertical direction guided by the outer mast 8*c*. The fork body 8*a* is lifted up and down supported by the inner mast 8*b* in an integrated manner to the inner mast 8*b*. The inner mast 8*b* is driven to lift up and down by the lift cylinder 4**.

Figure 3:
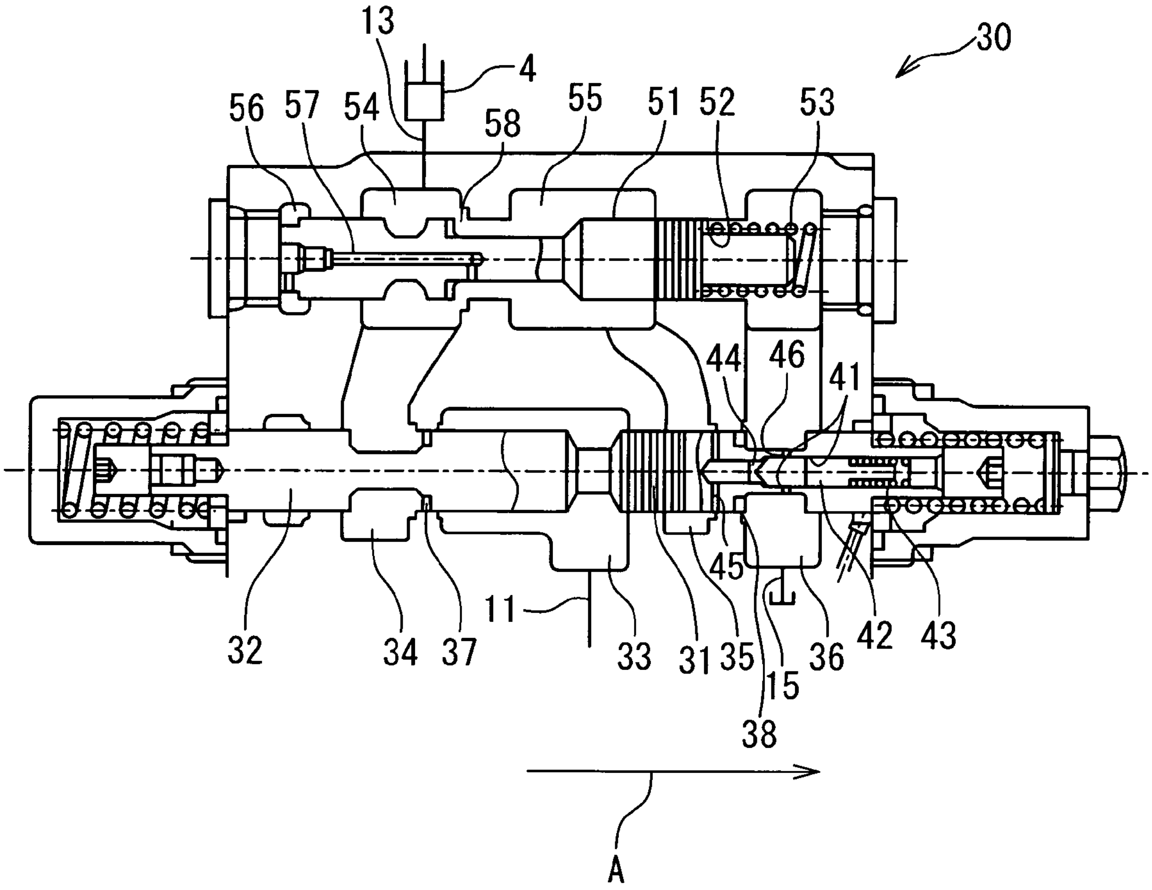
FIG. 3 is a cross sectional view showing the flow control valve main unit including the flow control valve 1.

FIG. 3 is a cross sectional view showing the flow control valve main unit including the flow control valve 1. The flow control valve main unit 30 includes a spool chamber 31 and a spool 32 which constitute the direction switching valve 2. That is, the spool chamber 31 has a cylindrical sliding surface therein. The spool 32 is provided so as to internally touch the sliding surface of the spool chamber 31 and be slidably inserted thereinto in the direction parallel to a direction A. In the flow control valve main unit 30, a pump pressure chamber 33, a load pressure chamber 34, a compensating pressure chamber 35 and a drain chamber 36 are provided in the spool chamber 31. The pump pressure chamber 33 is connected to the pump pressure line 11. The drain chamber 36 is connected to the drain line 15.

By sliding in the direction parallel to the direction A, the spool 32 is set at any of the neutral position, the meter-in position and the meter-out position. That is, the spool 32 is set at the meter-in position by moving from the neutral position in the direction A, and is set at the meter-out position by moving from the neutral position in the direction opposite to the direction A. The spool 32 is mechanically connected to a lever operated by the operator through a link mechanism and moves in the direction parallel to the direction A in proportion to an operation quantity of the lever.

The spool 32 may be replaced with the other spool moved by the other moving mechanism. An electric hydraulic pilot mechanism is exemplified as the moving mechanism of the spool. The electric hydraulic pilot mechanism further includes a potentiometer and a solenoid valve. The potentiometer detects an operation quantity of the lever operated by the operator and outputs a current corresponding to the operation quantity to the solenoid valve directly or through a control device not shown. The solenoid valve applies a pressure to the hydraulic oil such that the hydraulic oil has a pilot pressure corresponding to the current. The spool 32 of the direction switching valve 2 is pressed by the hydraulic oil with the pilot pressure to be directly operated.

The spool chamber 31 and the spool 32 include a variable orifice 38 and a variable orifice 37. The variable orifice 37 closes connection between the pump pressure chamber 33 and the load pressure chamber 34 when the spool 32 is set at the neutral position or the meter-out position, and connects the pump pressure chamber 33 to the load pressure chamber 34 when the spool 32 is set at the meter-in position. When the spool 32 is set at the meter-in position, the orifice area of the variable orifice 37 becomes larger as the spool 32 moves toward the direction A.

The variable orifice 38 closes connection between the compensating pressure chamber 35 and the drain chamber 36 when the spool 32 is set at the neutral position or the meter-in position, and connects the compensating pressure chamber 35 to the drain chamber 36 when the spool 32 is set at the meter-out position. When the spool 32 is set at the meter-out position, the orifice area of the variable orifice 38 becomes larger as the spool 32 moves toward the direction opposite to the direction A.

The spool 32 includes a spool chamber 41, a spool 42 and a spring 43 which constitutes the relief valve 21. The spool chamber 41 has a cylindrical sliding surface. The spool 42 is provided so as to internally touch the sliding surface of the spool chamber 41 and be slidably inserted thereinto in the direction parallel to a direction A. The spring 43 presses the spool 42 in the direction opposite to the direction A. In the spool 32, a pressure chamber 44 is provided between the spool 42 and the spool chamber 41.

The hydraulic oil of the pressure chamber 44 presses the spool 42 by its oil pressure in the direction A. That is, the spool 42 moves in the direction A when the oil pressure of the pressure chamber 44 is larger than the set pressure set by the spring 43.

The spool 32 further includes a hole 45 and a hole 46. The hole 45 is connected to the pressure chamber 44. The hole 45 is not connected to the compensating pressure chamber 35 when the spool 32 is set at the meter-in position and is connected to the compensating pressure 35 when the spool 32 is set at the neutral position or the meter-out position.

The hole 46 is connected to the drain chamber 36. The hole 46 is connected to the pressure chamber 44 when the spool 42 moves in the direction A, that is, when the oil pressure of the pressure chamber 44 is larger than the set pressure and is not connected to the pressure chamber 44 when the spool 42 does not move, that is, when the oil pressure of the pressure chamber 44 is smaller than the set pressure.

The flow control valve main unit 30 further includes a spool chamber 52, a spool 51 and a spring 53 which constitute the pressure compensating valve 5. That is, the spool chamber 52 has a cylindrical sliding surface. The spool 51 is provided so as to internally touch the sliding surface of the spool chamber 52 and be slidably inserted thereinto in the direction parallel to a direction A. The spring 53 presses the spool 52 in the direction opposite to the direction A.

In the flow control valve main unit 30, the spool chamber 52 includes a load pressure chamber 54, a compensating pressure chamber 55 and a pressure chamber 56. The load pressure chamber 54 is connected to a load pressure line 13. The compensating pressure chamber 55 is connected to the compensating pressure chamber 35. A hole 57 is formed on the spool 51. The hole 57 connects the compensating pressure chamber 55 to the pressure chamber 56. The hydraulic oil of the pressure chamber 56 presses the spool 52 by its oil pressure toward the direction A.

The spool chamber 52 and the spool 51 include a variable orifice 58. The variable orifice 58 narrows or closes the opening area between the load pressure chamber 54 and the compensating pressure chamber 55 when the spool 52 moves toward the direction A and enlarges the opening area when the spool 52 moves toward the direction opposite to the direction A.

Operations of the flow control valve 1 include the meter-in operation, the neutral operation and the meter-out operation. The meter-in operation is the operation performed when the direction switching valve 2 is switched from the neutral position to the meter-in position by the user. The neutral operation is the operation performed when the direction switching valve 2 is switched from the meter-in position or the meter-out position to the neutral position by the user. The meter-out operation is the operation performed when the direction switching valve 2 is switched from the neutral position to the meter-out position by the user.

In the meter-in operation, hydraulic oil is supplied from the pump pressure line 11 to the lift cylinder 4 through the direction switching valve 2, the pump switching line 12, the check valve 3 and the load pressure line 13. The lift cylinder 4 lifts the fork when the hydraulic oil is supplied.

In the neutral operation, since no hydraulic oil is supplied or discharged to the lift cylinder 4, lifting and lowering of the fork is stopped. The load pressure varies according to the weight of the load held by the fork of the forklift and becomes larger as the load is heavier. The hydraulic oil of the load pressure line 13 is supplied to the compensating pressure line 14 through the pressure compensating valve 5. The pressure compensating valve 5 prevents the oil pressure of the compensating pressure line 14 from becoming the set pressure or more by closing connection between the load pressure line 13 and the compensating pressure line 14 when the oil pressure of the compensating pressure line 14 is raised to the set pressure of the pressure compensating valve 5.

When the load pressure is larger than the set pressure, the pressure compensating valve 5 gradually leaks the hydraulic oil from the load pressure line 13 to the compensating pressure line 14 through a gap between the spool chamber 52 and the spool 51 with time even when connection between the load pressure line 13 and the compensating pressure line 14 is closed, and raises the oil pressure of the compensating pressure line 14. When the oil pressure of the compensating pressure line 14 is raised to the set pressure of the relief valve 21, the relief valve 21 connects the compensating pressure line 14 to the drain line 15 to flow the hydraulic oil of the compensating pressure line 14 to the drain line 15 and lowers the oil pressure of the compensating pressure line 14 to the set pressure.

In the meter-out operation, the hydraulic oil is discharged from the lift cylinder 4 to the drain line 15 through the load pressure line 13, the pressure compensating valve 5 and the direction switching valve 2. When the hydraulic oil is discharged, the lift cylinder 4 lowers the fork. At this time, the oil pressure of the compensating pressure line 14 is controlled to be the set pressure through the pressure compensating valve 5 irrespective of the weight of the load held by the fork. For this reason, in the meter-out operation, irrespective of the weight of the load held by the fork, the flow control valve 1 can associate the flow of the hydraulic oil discharged from the lift cylinder 4 to the drain line 15 with the operation quantity of the direction switching valve 2 on one-to-one basis. In other words, the forklift according to the present invention can associate the lowering speed of the fork with the operation quantity of the direction switching valve 2 on one-to-one basis, thereby improving operability of the fork.

In the case that the pressure of the compensating pressure line 14 is much higher than the set pressure, when the compensating pressure line 14 is connected to the drain line 15, the hydraulic oil rapidly flows from the compensating pressure line 14 to the drain line 15. The rapid flow generates shock or hunting in the operation of the lift cylinder 4. The flow control valve 1 controls the oil pressure of the compensating pressure line 14 in the neutral operation such that the oil pressure of the compensating pressure line 14 may not exceed the set pressure of the relief valve 21. Thus, the flow control valve 1 can prevent the hydraulic oil from rapidly flowing from the compensating pressure line 14 to the drain line 15 when the direction switching valve 2 is switched from the neutral position to the meter-out position. Therefore, the flow control valve 1 can prevent shock or hunting from occurring in the operation of the lift cylinder 4. That is, the forklift according to the present invention can prevent shock or hunting in the fork from occurring when the fork is lowered.

Figure 4:
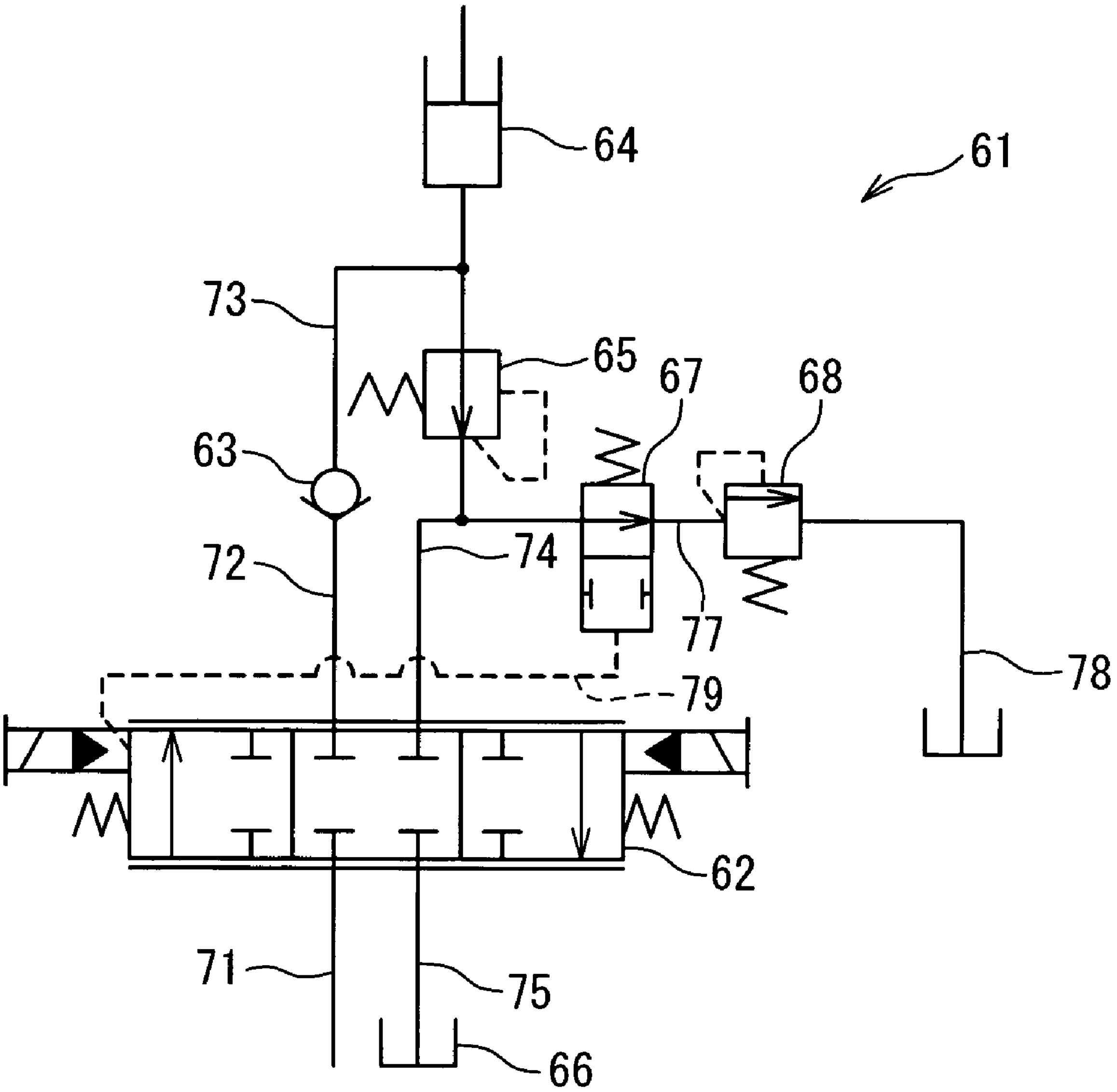
FIG. 4 is a schematic view showing another embodiment of a flow control valve according to the present invention.

FIG. 4 is a schematic view showing another embodiment of a flow control valve according to the present invention. The flow control valve 61 includes a direction switching valve 62, a check valve 63, a pressure compensating valve 65, a direction switching valve 67 and a relief valve 68. The flow control valve 61 further includes a plurality of lines for guiding hydraulic oil and transmitting oil pressure. The plurality of lines is composed of a pump pressure line 71, a pump pressure line 72, a load pressure line 73, a compensating pressure line 74, a drain line 75, a compensating pressure line 77 and a drain line 78.

The pump pressure line 71 connects the direction switching valve 62 to a pump not shown and guides the hydraulic oil supplied by the pump. The pump pressure line 72 connects the direction switching valve 62 to the check valve 63. The load pressure line 73 connects between the check valve 63, the lift cylinder 64 and the pressure compensating valve 65. The compensating pressure line 74 connects between the pressure compensating valve 65, the direction switching valve 62 and the direction switching valve 67. The compensating pressure line 77 connects the direction switching valve 67 to the relief valve 68. The drain line 75 connects the direction switching valve 62 to the tank 66. The oil pressure of the drain line 75 is substantially zero (0). The drain line 78 connects the relief valve 68 to the tank 66. The oil pressure of the drain line 78 is substantially zero (0).

The check valve 63 prevents the hydraulic oil from flowing from the load pressure line 73 to the pump pressure line 72. That is, the check valve 63 connects the pump pressure line 72 to the load pressure line 73 when the oil pressure of the pump pressure line 72 is larger than that of the load pressure line 73, and does not connect the pump pressure line 72 to the load pressure line 73 when the oil pressure of the load pressure line 73 is larger than that of the pump pressure line 72.

The lift cylinder 64 is an actuator for lifting and lowering the fork of the forklift according to the present invention. That is, the lift cylinder 64 lifts the fork of the forklift when hydraulic oil is supplied from the load pressure line 73 and lowers the fork of the forklift when hydraulic oil is discharged into the load pressure line 73. At this time, the oil pressure of the load pressure line 73 varies depending on the weight of a load held by the fork of the forklift and becomes larger as the load is heavier.

The pressure compensating valve 65 performs control such that the oil pressure of the compensating pressure line 74 is a set pressure. That is, the pressure control valve 65 enlarges the opening area of a variable orifice between the load pressure line 73 and the compensating pressure line 74 when the oil pressure of the compensating pressure line 74 is smaller than the set pressure, and narrows the opening area of the variable orifice when the oil pressure of the compensating pressure line 74 is larger than the set pressure.

The spool of the direction switching valve 62 can occupy one of the neutral position, the meter-in position and the meter-out position. That is, the direction switching valve 62 includes a potentiometer and a solenoid valve not shown. The potentiometer detects an operation quantity of the lever operated by the operator and outputs a current corresponding to the operation quantity to the solenoid valve directly or through a control device not shown. The solenoid valve applies a pressure such that the hydraulic oil has a pilot pressure corresponding to the current. The hydraulic oil is composed of two hydraulic oils. One is a hydraulic oil for pressing the spool of the direction switching valve 62 from right to left. The other is a hydraulic oil for pressing the spool of the direction switching valve 62 from left to right. The spool of the direction switching valve 62 is moved by being pressed by the hydraulic oil with the pilot pressure to be switched from the neutral position to the meter-in position and from the neutral position to the meter-out position.

At the meter-in position, the direction switching valve 62 connects the pump pressure line 71 to the pump pressure line 72, closes the compensating pressure line 74 and closes the drain line 75. At the meter-out position, the direction switching valve 62 closes the pump pressure line 71, closes the pump pressure line 72 and connects the compensating pressure line 74 to the drain line 75. At the neutral position, the direction switching valve 62 closes the pump pressure line 71, closes the pump pressure line 72, closes the compensating pressure line 74 and closes the drain line 75.

The flow control valve 61 further includes a pilot pressure line 79. The pilot pressure line 79 presses the spool of the direction switching valve 67 from left to right to transmit the pilot pressure of the hydraulic oil for moving the spool from the neutral position to the meter-in position to the direction switching valve 67. The pilot pressure is raised when the spool of the direction switching valve 67 is moved from the neutral position to the meter-in position, and is not raised when the spool of the direction switching valve 67 is moved to the neutral position or the meter-out position.

When the pilot pressure is raised, the spool of the direction switching valve 67 is pressed by the pilot pressure to close connection between the compensating pressure line 74 and the compensating pressure line 77. When the pilot pressure is not raised, the spool of the direction switching valve 67 is pressed by the pilot pressure to connect the compensating pressure line 74 to the compensating pressure line 77. That is, the direction switching valve 67 closes connection between the compensating pressure line 74 and the compensating pressure line 77 when the spool of the direction switching valve 67 is set at the meter-in position, and connects the compensating pressure line 74 to the compensating pressure line 77 when the spool of the direction switching valve 67 is set at the neutral position or the meter-out position.

The relief valve 68 performs control such that the oil pressure of the compensating pressure line 77 does not exceed the set pressure. The set pressure of the relief valve 68 is larger than the set pressure of the pressure compensating valve 65. That is, the relief valve 68 connects the compensating pressure line 77 to the drain line 78 when the oil pressure of the compensating pressure line 77 is larger than the set pressure, and does not connect the compensating pressure line 77 to the drain line 78 when the oil pressure of the compensating pressure line 77 is smaller than the set pressure.

The tank 66 stores hydraulic oil flowing through the drain line 75 and the drain line 78 therein. The hydraulic oil stored in the tank 66 is supplied to the pump pressure line 71 by a pump not shown.

As shown in FIG. 6, the flow control valve 61 is mounted on the forklift 7 of the present invention. The forklift 7 includes the flow control valve 61, the fork 8 and the lift cylinder 64. The flow control valve 61 is included in a hydraulic circuit (not shown) mounted on the forklift 7. The lift cylinder 64 is connected between the flow control valve 61 and the fork 8. The fork 8 lifts and lowers a load. The lift cylinder 64 drives the folk 8 along with the flow control valve 61.

Operations of the flow control valve 61 include the meter-in operation, the neutral operation and the meter-out operation. The meter-in operation is an operation performed when the direction switching valve 62 is switched from the neutral position to the meter-in position by means of the user's operation. The neutral operation is an operation performed when the direction switching valve 62 is switched from the meter-in position or the meter-out position to the neutral position by means of the user's operation. The meter-out operation is an operation performed when the direction switching valve 62 is switched from the neutral position to the meter-out position by means of the user's operation.

In the meter-in operation, the hydraulic oil supplied by the pump is supplied from the pump pressure line 71 to the lift cylinder 64 through the direction switching valve 62, the pump pressure line 72, the check valve 63 and the load pressure line 73. When the hydraulic oil is supplied, the lift cylinder 64 lifts the fork.

In the neutral operation, since no hydraulic oil is supplied or discharged between the lift cylinder 64 and the load pressure line 73, lifting or lowering of the fork is stopped. The load pressure varies depending on a load held by the fork of the forklift and becomes larger as the load is heavier. The hydraulic oil of the load pressure line 73 is supplied to the compensating pressure line 74 through the pressure compensating valve 65. The pressure compensating valve 65 closes connection between the load pressure line 73 and the compensating pressure line 74, when the oil pressure of the compensating pressure line 74 is raised to the set pressure of the pressure compensating valve 65, thereby preventing the oil pressure of the compensating pressure line 74 from exceeding the set pressure. The direction switching valve 67 connects the compensating pressure line 74 to the compensating pressure line 77.

When the load pressure is larger than the set pressure, the pressure compensating valve 65 gradually leaks the hydraulic oil from the load pressure line 73 to the compensating pressure line 74 through a gap between the spool chamber and the spool with time even when connection between the load pressure line 73 and the compensating pressure line 74 is closed, and raises the oil pressure of the compensating pressure line 74. When the oil pressure of the compensating pressure line 77 is raised to the set pressure of the relief valve 68, the relief valve 68 connects the compensating pressure line 77 to the drain line 78 to flow the hydraulic oil of the compensating pressure line 77 to the drain line 78 and lowers the oil pressure of the compensating pressure line 77 to the set pressure.

In the meter-out operation, the hydraulic oil is discharged from the lift cylinder 64 to the drain line 15 through the load pressure line 73, the pressure compensating valve 65, the compensating pressure line 74 and the direction switching valve 62. When the hydraulic oil is discharged, the lift cylinder 64 lowers the fork. At this time, the oil pressure of the compensating pressure line 74 is controlled by the pressure compensating valve 65 to be the set pressure irrespective of the weight of the load held by the fork. For this reason, in the meter-out operation, irrespective of the weight of the load held by the fork, the flow control valve 61 can associate the flow of the hydraulic oil discharged from the lift cylinder 64 to the drain line 75 with the operation quantity of the direction switching valve 62 on one-to-one basis. In other words, the forklift according to the present invention can associate the lowering speed of the fork with the operation quantity of the direction switching valve 62 on one-to-one basis, thereby improving operability of the fork.

Like the flow control valve 1 in the above-mentioned embodiment, the flow control valve 61 controls the oil pressure of the compensating pressure line 74 in the neutral position is controlled so as to be smaller than the set pressure of the relief valve 68. The flow control valve 61 has more complicated configuration than the flow control valve 1 in the above-mentioned embodiment since the direction switching valve 67 is provided. However, similarly to the flow control valve 1 in the above-mentioned embodiment, the flow control valve 61 can prevent shock or hunting from occurring in the operation of the lift cylinder 64. That is, the relief valve 68 performs control such that the oil pressure of the compensating pressure line 74 in the neutral position does not exceed the set pressure. The relief valve 68 can be installed inside or outside of the direction switching valve operated by the operator and thus no attention is paid to the installation position.

Figure 5:
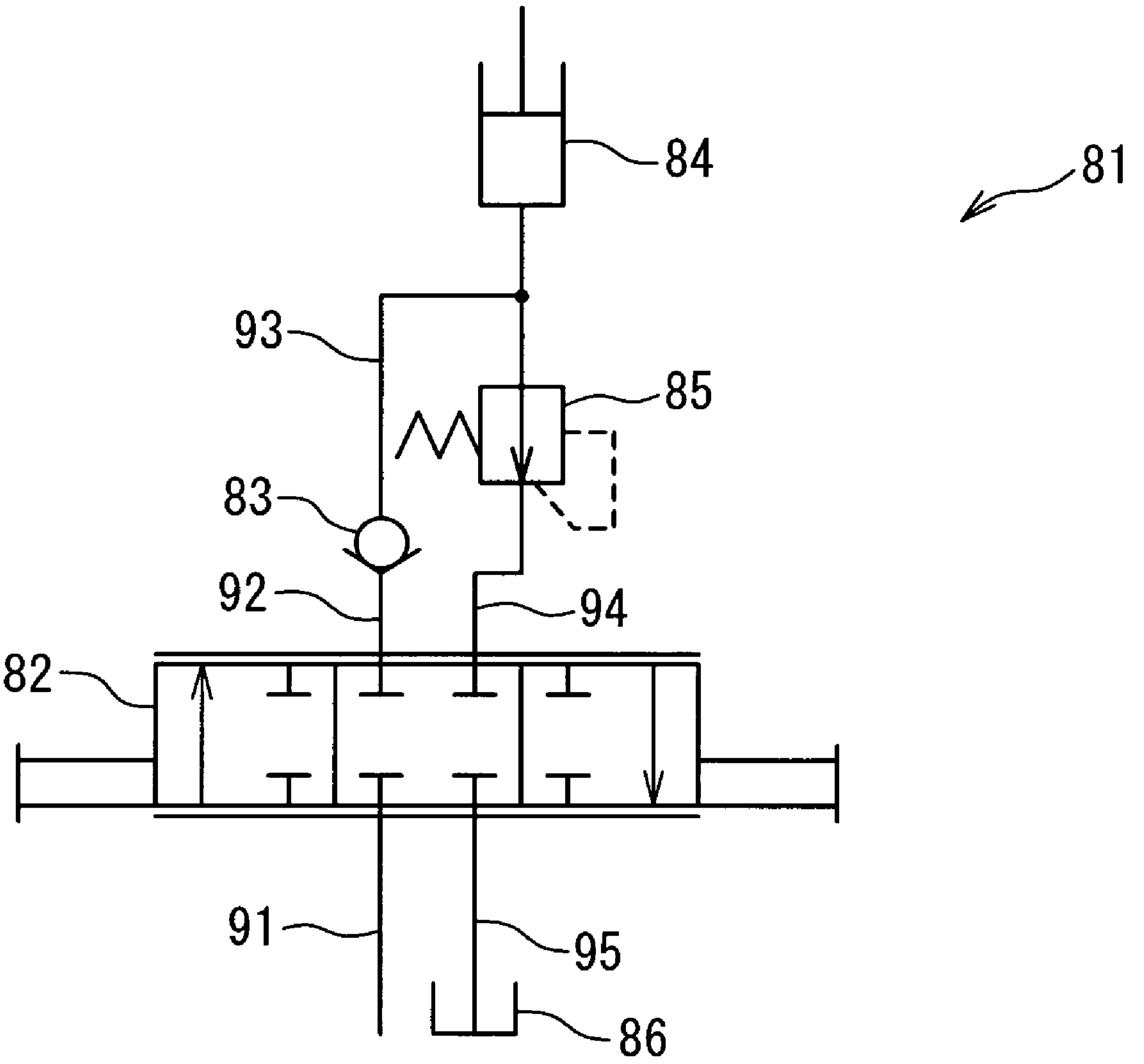
FIG. 5 is a schematic view showing still another embodiment of a flow control valve according to the present invention.

FIG. 5 is a schematic view showing still another embodiment of a flow control valve according to the present invention. The flow control valve 81 includes a direction switching valve 82, a check valve 83 and a pressure compensating valve 85. The flow control valve 81 further includes a plurality of lines for guiding hydraulic oil and transmitting oil pressure. The plurality of lines is composed of a pump pressure line 91, a pump pressure line 92, a load pressure line 93, a compensating pressure line 94 and a drain line 95.

The pump pressure line 91 connects the direction switching valve 82 to a pump not shown and guides the hydraulic oil supplied by the pump. The pump pressure line 92 connects the direction switching valve 82 to the check valve 83. The load pressure line 93 connects between the check valve 83, the lift cylinder 84 and the pressure compensating valve 85. The compensating pressure line 94 connects the pressure compensating valve 85 to the direction switching valve 82. The drain line 95 connects the direction switching valve 82 to the tank 86 and the oil pressure of the drain line 95 is substantially zero (0).

The check valve 83 prevents the hydraulic oil from flowing from the load pressure line 93 to the pump pressure line 92. That is, the check valve 83 connects the pump pressure line 92 to the load pressure line 93 when the oil pressure of the pump pressure line 92 is larger than that of the load pressure line 93, and does not connect the pump pressure line 92 to the load pressure line 93 when the oil pressure of the load pressure line 93 is larger than that of the pump pressure line 92.

The lift cylinder 84 is an actuator for lifting and lowering the fork of the forklift according to the present invention. That is, the lift cylinder 84 lifts the fork of the forklift when hydraulic oil is supplied from the load pressure line 93 and lowers the fork of the forklift when hydraulic oil is discharged into the load pressure line 93. At this time, the oil pressure of the load pressure line 93 varies depending on the weight of a load held by the fork of the forklift and becomes larger as the load is heavier.

The pressure compensating valve 85 performs control such that the oil pressure of the compensating pressure line 94 is a set pressure. That is, the pressure control valve 85 enlarges the opening area of a variable orifice between the load pressure line 93 and the compensating pressure line 94 when the oil pressure of the compensating pressure line 94 is smaller than the set pressure, and narrows the opening area of the variable orifice when the oil pressure of the compensating pressure line 94 is larger than the set pressure.

The direction switching valve 82 can occupy one of the neutral position, the meter-in position and the meter-out position. That is, the direction switching valve 82 is switched from the neutral position to the meter-in position, from the neutral position to the meter-out position, from the meter-in position to the neutral position and from the meter-out position to the neutral position by the user's operation.

At the meter-in position, the direction switching valve 82 connects the pump pressure line 91 to the pump pressure line 92, closes the compensating pressure line 94 and closes the drain line 95. At the meter-out position, the direction switching valve 82 closes the pump pressure line 91, closes the pump pressure line 92 and connects the compensating pressure line 94 to the drain line 95. At the neutral position, the direction switching valve 82 closes the pump pressure line 91, closes the pump pressure line 92, closes the compensating pressure line 94 and closes the drain line 95.

The tank 86 stores hydraulic oil flowing through the drain line 95 therein. The hydraulic oil stored in the tank 86 is supplied to the pump pressure line 91 by the pump not shown.

As shown in FIG. 6, the flow control valve 81 is mounted on the forklift 7 of the present invention. The forklift 7 includes the flow control valve 81, the fork 8 and the lift cylinder 84. The flow control valve 81 is included in a hydraulic circuit (not shown) mounted on the forklift 7. The lift cylinder 84 is connected between the flow control valve 81 and the fork 8. The fork 8 lifts and lowers a load. The lift cylinder 84 drives the folk 8 along with the flow control valve 81.

Operations of the flow control valve 81 include the meter-in operation, the neutral operation and the meter-out operation. The meter-in operation is an operation performed when the direction switching valve 82 is switched from the neutral position to the meter-in position by means of the user's operation. The neutral operation is an operation performed when the direction switching valve 82 is switched from the meter-in position or the meter-out position to the neutral position by means of the user's operation. The meter-out operation is an operation performed when the direction switching valve 82 is switched from the neutral position to the meter-out position by means of the user's operation.

In the meter-in operation, the hydraulic oil is supplied from the pump pressure line 91 to the lift cylinder 84 through the direction switching valve 82, the pump pressure line 92, the check valve 83 and the load pressure line 93. When the hydraulic oil is supplied, the lift cylinder 84 lifts the fork.

In the neutral operation, since no hydraulic oil is supplied or discharged between the lift cylinder 84 and the load pressure line 93, lifting or lowering of the fork is stopped. The load pressure of the hydraulic oil of the load pressure line 93 varies depending on a load held by the fork of the forklift and becomes larger as the load is heavier. The hydraulic oil of the load pressure line 93 is supplied to the compensating pressure line 94 through the pressure compensating valve 85. The pressure compensating valve 85 closes connection between the load pressure line 93 and the compensating pressure line 94, when the oil pressure of the compensating pressure line 94 is raised to the set pressure of the pressure compensating valve 85, thereby preventing the oil pressure of the compensating pressure line 94 from becoming the set pressure or more.

In the meter-out operation, the hydraulic oil is discharged from the lift cylinder 84 to the drain line 95 through the load pressure line 93, the pressure compensating valve 85, the compensating pressure line 94 and the direction switching valve 82. When the hydraulic oil is discharged, the lift cylinder 84 lowers the fork. At this time, the oil pressure of the compensating pressure line 94 is controlled by the pressure compensating valve 85 to be the set pressure irrespective of the weight of the load held by the fork. At this time, in the meter-out operation, irrespective of the weight of the load held by the fork, the flow control valve 81 can associate the flow of the hydraulic oil discharged from the lift cylinder 84 to the drain line 95 with the operation quantity of the direction switching valve 82 on one-to-one basis. In other words, the forklift according to the present invention can associate the lowering speed of the fork with the operation quantity of the direction switching valve 82 on one-to-one basis, thereby improving operability of the fork.

In the case of high pressure of the compensating pressure line 94, when the compensating pressure line 94 is connected to the drain line 95, the hydraulic oil rapidly flows from the compensating pressure line 94 to the drain line 95. The rapid flow generates shock or hunting in the operation of the lift cylinder 84. Since the flow control valve does not control the oil pressure of the compensating pressure line 94 in the neutral operation, when the direction switching valve 82 is switched from the neutral position to the meter-out position, the hydraulic oil cannot be prevented from rapidly flowing from the compensating pressure line 94 to the drain line 95. Although the forklift to which the flow control valve 81 is applied cannot prevent shock or hunting from generating in the fork when the fork is lowered, it is better than that the lowering speed of the fork cannot be associated with the operation quantity of the direction switching valve 82 on one-to-one basis.

A flow control valve according to the present invention can improve operability of a hydraulic actuator.

It is apparent that the present invention is not limited to the above embodiment, that may be modified and changed without departing form the scope and spirit of the invention.

What is claimed is:

1. A flow control valve, comprising:

a pressure compensating valve configured to enlarge an opening area of a variable orifice between a load pressure line and a compensating pressure line when a pressure of working fluid in said compensating pressure line is smaller than a first set pressure, and narrow said opening area of said variable orifice when said pressure of said working fluid in said compensating pressure line is larger than said first set pressure; and a first switching valve configured to switch between a meter-out operation and a neutral operation by an external operation. wherein said working fluid in said compensating pressure line is drained in said meter-out operation, and neither said working fluid is supplied to said load pressure line nor said working fluid in said compensating pressure line is drained in said neutral operation;

wherein said load pressure line guides said working fluid to be supplied to an actuator; and said pressure compensating valve varies the opening area of said variable orifice when said first switching valve is in the neutral operation, the flow control valve further comprising:

a relief valve configured to drain said working fluid in said compensating pressure line when said pressure of said working fluid in said compensating pressure line is larger than a second set pressure, and configured not to drain said working fluid in said compensating pressure line when said pressure of said working fluid in said compensating pressure line is smaller than said second set pressure, wherein said first switching valve switches among a meter-in operation, said meter-out operation, and said neutral operation by an external operation, wherein said working fluid is supplied to said load pressure line in said meter-in operation for operating said actuator, wherein said relief valve is not connected to said compensating pressure line when said first switching valve is in said meter-in operation.

2. The flow control valve according to claim 1, wherein said first switching valve includes:

a first spool chamber, and a first spool configured to be slidably inserted into said first spool chamber, said relief valve includes:

a second spool chamber configured to be formed in said first spool, and a second spool configured to be slidably inserted into said second spool chamber.

3. A forklift, comprising:

a flow control valve;

a fork configured to lift a load; and an actuator configured to be connected between said flow control valve and said fork, wherein said flow control valve includes:

a pressure compensating valve configured to enlarge an opening area of a variable orifice between a load pressure line and a compensating pressure line when a pressure of working fluid in said compensating pressure line is smaller than a first set pressure, and narrow said opening area of said variable orifice when said pressure of said working fluid in said compensating pressure line is larger than said first set pressure, and a first switching valve configured to switch between a meter-out operation and a neutral operation by an external operation. wherein said working fluid in said compensating pressure line is drained in said meter-out operation. and neither said working fluid is supplied to said load pressure line nor said working fluid in said working fluid in said compensating pressure line is drained in said neutral operation, wherein said load pressure line guides said working fluid to be supplied to said actuator; and said pressure compensating valve varies the opening area of said variable orifice when said first switching valve is in the neutral operation, wherein said flow control valve further includes:

a relief valve configured to drain said working pressure in said compensating pressure line when said pressure of said working fluid in said compensating pressure line is larger than a second set pressure, and configured not to drain said working fluid in said compensating pressure line when said pressure of said working fluid in said compensating pressure line is smaller than said second set pressure, wherein said first switching valve switches among a meter-in operation, said meter-out operation, and said neutral operation by an external operation, wherein said working fluid is supplied to said load pressure line in said meter-in operation for operating said actuator, and wherein said relief valve is not connected to said compensating pressure line when said first switching valve is in said meter-in operation.

4. The forklift according to claim 3, wherein said first switching valve includes:

a first spool chamber, and a first spool configured to be slidably inserted into said first spool chamber, said relief valve includes:

a second spool chamber configured to be formed in said first spool, and a second spool configured to be slidably inserted into said second spool chamber.

* * * * *